US011964381B2

(12) United States Patent
Baldinger et al.

(10) Patent No.: US 11,964,381 B2
(45) Date of Patent: Apr. 23, 2024

(54) DEVICE FOR CONTROLLING A HANDLING DEVICE

(71) Applicant: BLUE DANUBE ROBOTICS GMBH, Vienna (AT)

(72) Inventors: Andreas Baldinger, Vienna (AT); Tobias Ferner, Vienna (AT); Walter Wohlkinger, Vienna (AT); Michael Zillich, Vienna (AT); Daniel Byberg, Chignolo d'Isola (IT); Patrick Frager, Villach-St. Magdalen (AT)

(73) Assignee: BLUE DANUBE ROBOTICS GMBH, Vienna (AT)

( * ) Notice: Subject to any disclaimer, the term of this patent is extended or adjusted under 35 U.S.C. 154(b) by 827 days.

(21) Appl. No.: 17/048,854

(22) PCT Filed: Apr. 18, 2019

(86) PCT No.: PCT/AT2019/000012
§ 371 (c)(1),
(2) Date: Oct. 19, 2020

(87) PCT Pub. No.: WO2019/200415
PCT Pub. Date: Oct. 24, 2019

(65) Prior Publication Data
US 2021/0146550 A1 May 20, 2021

(30) Foreign Application Priority Data
Apr. 20, 2018 (AT) .................................. A 114/2018

(51) Int. Cl.
*B25J 13/08* (2006.01)
*B25J 9/16* (2006.01)

(52) U.S. Cl.
CPC ........... *B25J 13/084* (2013.01); *B25J 9/1666* (2013.01)

(58) Field of Classification Search
CPC .............................. B25J 13/084; B25J 9/1666
See application file for complete search history.

(56) References Cited

U.S. PATENT DOCUMENTS 5,002,173 A 3/1991 Hucul et al.
8,606,398 B2 * 12/2013 Eakins .................. B25J 13/085
901/29

(Continued)

FOREIGN PATENT DOCUMENTS

DE 102007038922 B3 12/2008
DE 102007062245 A1 6/2009

(Continued)

OTHER PUBLICATIONS

International Search Report dated Aug. 9, 2019 issued in corresponding International Application No. PCT/AT2019/000012 with English translation (5 pgs.).

*Primary Examiner* — Michael Collins
(74) *Attorney, Agent, or Firm* — Pillsbury Winthrop Shaw Pittman, LLP

(57) ABSTRACT

A device for controlling a handling device comprising a carrier housing which can be arranged on the handling device with a tactile sensor body arranged on the outside of the carrier housing and a tool carrier movably mounted on the carrier housing, wherein the sensor body can be actuated by the tool carrier when load is acting on the tool carrier, wherein the sensor body is formed by a gas-filled chamber which is surrounded by a flexible shell, which can be deformed by collision with an obstacle, and further comprises a pressure sensor for measuring the gas pressure prevailing inside the chamber.

9 Claims, 5 Drawing Sheets

(56) References Cited

U.S. PATENT DOCUMENTS

| | | | | |
|---|---|---|---|---|
| 8,862,269 | B2* | 10/2014 | Martinez | B25J 13/08 |
| | | | | 700/250 |
| 9,079,308 | B2* | 7/2015 | Martinez | B25J 13/085 |
| 9,126,336 | B2* | 9/2015 | Eakins | B25J 15/04 |
| 2014/0052295 | A1* | 2/2014 | Eakins | B25J 9/1694 |
| | | | | 901/31 |
| 2018/0029238 | A1 | 2/2018 | Basit | |
| 2021/0170571 | A1* | 6/2021 | Tadayon | F24S 25/70 |

FOREIGN PATENT DOCUMENTS

| | | |
|---|---|---|
| DE | 202012012857 U1 | 2/2014 |
| DE | 102015219332 A1 | 4/2017 |
| WO | 2016/000005 A1 | 1/2016 |

* cited by examiner

DEVICE FOR CONTROLLING A HANDLING DEVICE

CROSS-REFERENCE TO RELATED APPLICATIONS

This application is a national stage entry of PCT/AT2019/000012, filed Apr. 18, 2019, which claims priority to Austrian Application No. A 114/2018, filed Apr. 20, 2018, the entire contents of each of which are herein incorporated by reference in their entireties.

The invention relates to a device for controlling a handling device and a handling device with the device according to the invention.

BACKGROUND

WO 2016/000005 A1 describes a tactile safety sensor for protecting people and stationary or autonomously moving obstacles from stationary or autonomously moving handling devices, in particular industrial robots, such as manufacturing, transport, inspection or service robots and their manipulators. For collision detection, the safety sensor or a plurality of such safety sensors is attached to the handling device and/or to its manipulators. The safety sensor described in WO 2016/000005 A1 essentially comprises an airtight shell which encloses a gas- or air-filled chamber and an internal barometric pressure sensor. The shape of the shell is supported by a resilient support structure, the support structure and the shell together forming the body of the sensor. The support structure ensures dimensional stability and mechanical damping of the forces acting in a collision. Touching the sensor leads to a deformation of the shell and thus to a compression of the chamber including the support structure, which in turn leads to a measurable increase in pressure inside the shell. A pressure rise above a certain threshold value leads to the stop of the handling device, on the surface of which the sensor is attached.

While this safety sensor offers a high level of operational reliability with regard to the structure of the handling device itself, there is still the risk that a user or a fixed structure collides with an object and in particular with a tool guided by a robot, whereby there is still a considerable risk of injury when working with such handling devices. The invention is therefore based on the object of minimizing this risk as well.

SUMMARY

To solve this object, the inventive device comprises a carrier housing which can be arranged on the handling device with a tactile sensor body arranged on the outside of the carrier housing and a tool carrier movably mounted on the carrier housing, wherein the sensor body can be actuated by the tool carrier when load is acting on the tool carrier, wherein the sensor body is formed by a gas-filled chamber which is surrounded by a flexible shell, which can be deformed by collision with an obstacle, and further comprises a pressure sensor for measuring the gas pressure prevailing inside the chamber.

The device according to the invention therefore serves as a control device for protection by securing a tool guided by a handling device (e.g. a robot) against collision with an obstacle. In such a collision a load is acting upon the tool and the tool carrier is moved due to its movable mounting, whereby the sensor body is actuated by the tool carrier. The sensor body registers the load and the machine can be controlled accordingly. The control can include the immediate stopping and, if necessary, the retraction of the handling device or the handling device can be moved into a rest position. Such sensor bodies have already been tested for use with robots and can be designed in any conceivable shape in order to essentially completely cover the handling device. As a result, more or less the entire surface of a robot is secured, so that collisions with serious consequences for facilities or people in the vicinity of a robot can be avoided without a completely new technology having to be used to secure a tool guided by the robot. In particular, the control of the device according to the invention can be integrated into the control of the handling device with such a shaped body.

The sensor bodies just mentioned evaluate the pressure increase in the gas-filled chamber when touched from the outside. For reliable detection of a collision with the tool carrier or a tool attached to the tool carrier, it is therefore advantageous if the sensor body is arranged at least partially in a gap between the carrier housing and the tool carrier. When the tool carrier is loaded in the event of a collision with an obstacle, it moves relative to the carrier housing and the gap is reduced, whereby the sensor body is trapped, which leads to a strong and therefore easily evaluable pressure increase in the chamber.

The device according to the invention is preferably developed in such a way that the sensor body encloses the carrier housing with a first area and engages with a second area in the gap formed between the carrier housing and the tool carrier. Thus, the entire device according to the invention is secured, since both a collision of the tool carrier or a tool mounted on it with an obstacle and a collision with the carrier housing are detected with the aid of the sensor body and can be evaluated accordingly to control the handling device.

In a particularly advantageous manner, the tool carrier has a mounting plate for tools which, together with the carrier housing, forms the gap. Mounting plates are used for the modular assembly of robots and enable quick tool changes. If the device according to the invention now provides such a plate which simultaneously forms the gap together with the carrier housing, the usual use of tools with the device according to the invention is not complicated, since the tool can simply be mounted on the mounting plate.

This idea is pursued particularly efficiently if the carrier housing comprises a mounting element that matches a mounting plate for a tool, as corresponds to a preferred embodiment of the present invention. This means that the safety device according to the invention can be connected to the handling device like a conventional tool.

In order to ensure the necessary mobility of the tool carrier with respect to the carrier housing, the device according to the invention is preferably developed in such a way that the tool carrier protrudes from the interior of the carrier housing through an opening in the wall of the carrier housing and is resiliently pressed against the inside of the wall of the carrier housing.

In order to ensure sufficient mobility of the tool carrier in the opening, the invention is preferably developed in such a way that the tool carrier comprises an outwardly tapering shaft on its area protruding through a wall of the carrier housing so that the tool carrier when moving in the sense of a tilting has sufficient clearance in the opening.

The handling device according to the invention is characterized by the presence of the device according to the invention and is preferably developed in such a way that the handling device carries a sensor body in areas different from the device for controlling the handling device. According to this preferred embodiment of the present invention, the handling device, for example a robot, can be completely or at least partially secured against collisions with devices or people, so that a high operational reliability of the robot is achieved.

In the context of the present invention, the sensor body is preferably formed by a gas-filled chamber which is surrounded by a flexible shell that can be deformed by collision with an obstacle and which also includes a pressure sensor for measuring the gas pressure inside the chamber. Such sensor bodies have already been tested for use with robots and can be designed in any conceivable form in order to cover the handling device essentially completely or at least in areas. As a result, more or less the entire area of a robot threatened by a collision is secured, so that collisions with serious consequences for facilities or people in the vicinity of a robot can be avoided without an entirely new technology having to be used to secure a tool guided by the robot. In particular, the control of the handling device according to the invention can be carried out analogously to the control of the known handling device with such a shaped body.

BRIEF DESCRIPTION OF DRAWINGS

The invention is explained in more detail below with the aid of an exemplary embodiment shown schematically in the drawings. In the drawings.

DETAILED DESCRIPTION

Figure 1:
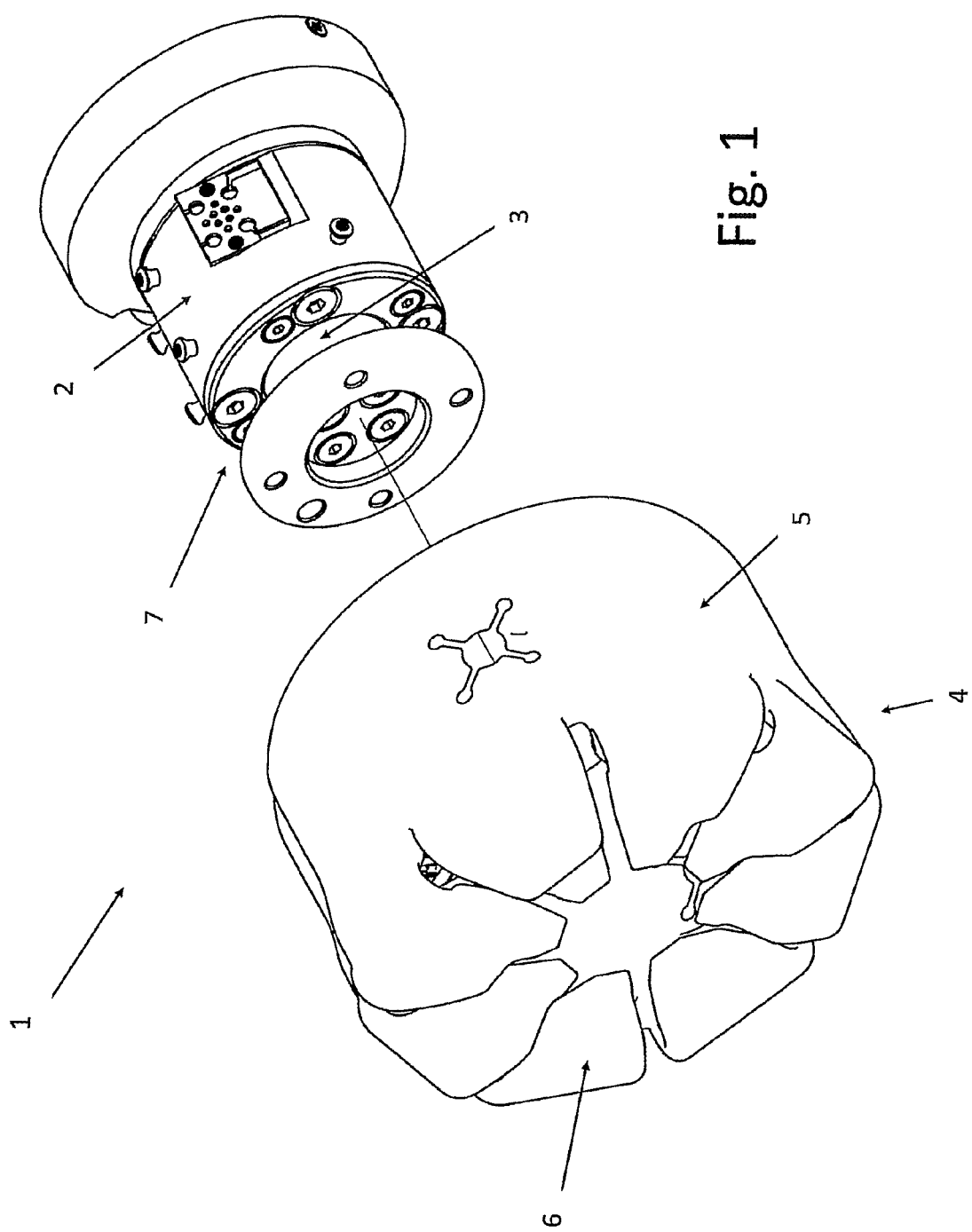
FIG. 1 shows a schematic exploded view of the device according to the invention.

In FIG. 1, the device according to the invention is generally designated by the reference number 1. It essentially consists of a carrier housing 2, a tool carrier 3 and a sensor body 4 which essentially completely encloses the carrier housing with a first area 5. The sensor body 4 furthermore has a second region 6 which engages in the gap 7 formed between the carrier housing 2 and the tool carrier 3. The sensor body 4 is of the type mentioned in WO 2016/000005 A1 and is formed by a gas-filled chamber which is surrounded by a flexible shell that can be deformed by collision with an obstacle and also includes a pressure sensor for measuring the gas pressure inside the chamber, the pressure sensor and evaluation electronics not being shown in FIG. 1. A spring is denoted by reference numeral 18.

Figure 2:
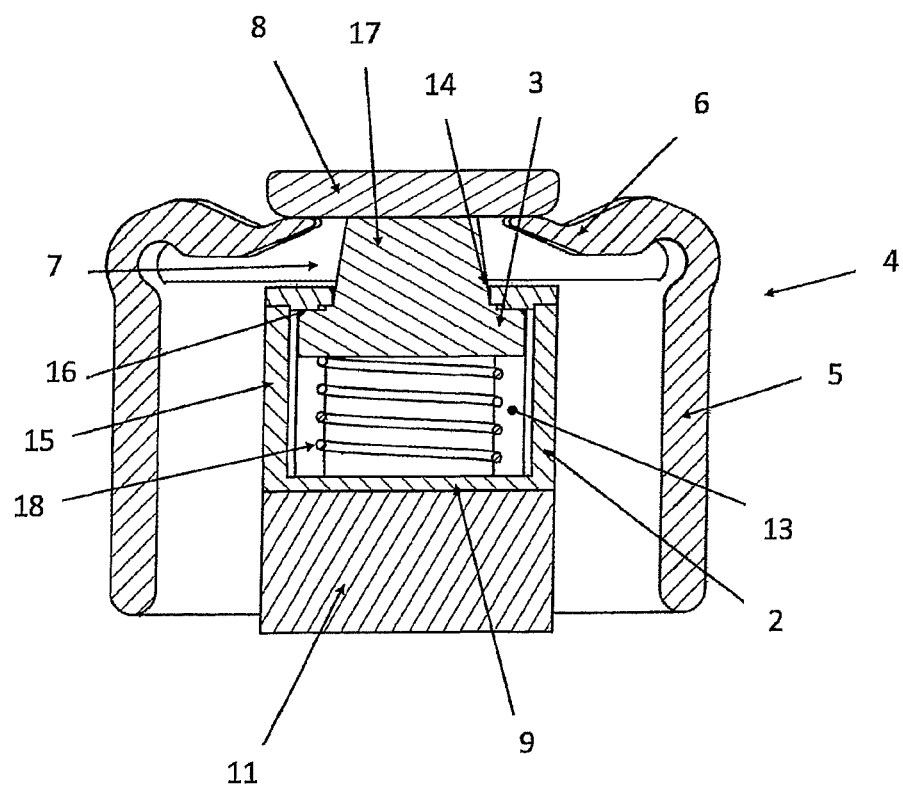
FIG. 2 shows a sectional view of the device according to the invention.

In FIG. 2 it can be seen more clearly how the sensor body 4 engages with its second area 6 in the gap 7 formed between the carrier housing 2 and the tool carrier 3, wherein the tool carrier 3 in the examples shown in the figures comprises a mounting plate 8 for tools that forms the gap 7 together with the carrier housing 2. The carrier housing 2 also has a mounting element 9, which is not shown in detail in the drawing and which fits a mounting plate 8 for a tool, in the region of its bottom. With 11 an unspecified attachment of a handling device is referred to. In FIG. 2 it can also be seen that the tool holder 3 protrudes from the interior 13 of the support housing 2 through an opening 14 in the wall 15 of the carrier housing 2 and is resiliently pressed against the inside 16 of the wall 15 of the carrier housing 2, wherein the tool carrier 3 is secured in the opening 14 of the tool carrier 2 by a seam that is offset in comparison to a shaft 17. The shaft 17 of the tool carrier 3 tapers from the inside outwards in order to ensure that the shaft 17 is sufficiently exposed in the opening 14 of the carrier housing 2 so that the tool carrier 3 can tilt. The tool carrier 3 is preloaded by a spring (not shown) in such a way that it remains rigidly in the rest position without the action of external forces. If the acting forces exceed a limit value that can be set by the stiffness of the spring, the tool carrier tilts or shifts.

Figure 3:
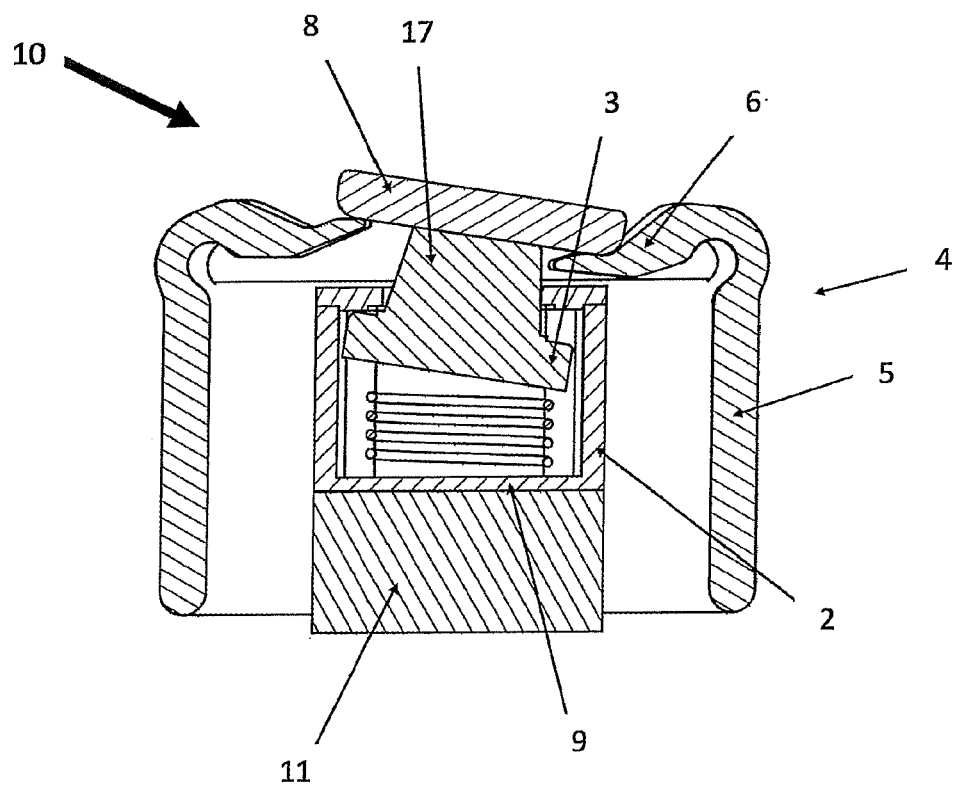
FIGS. 3 and 4 show sectional views of the device according to the invention in different loading situations.
Figure 4:
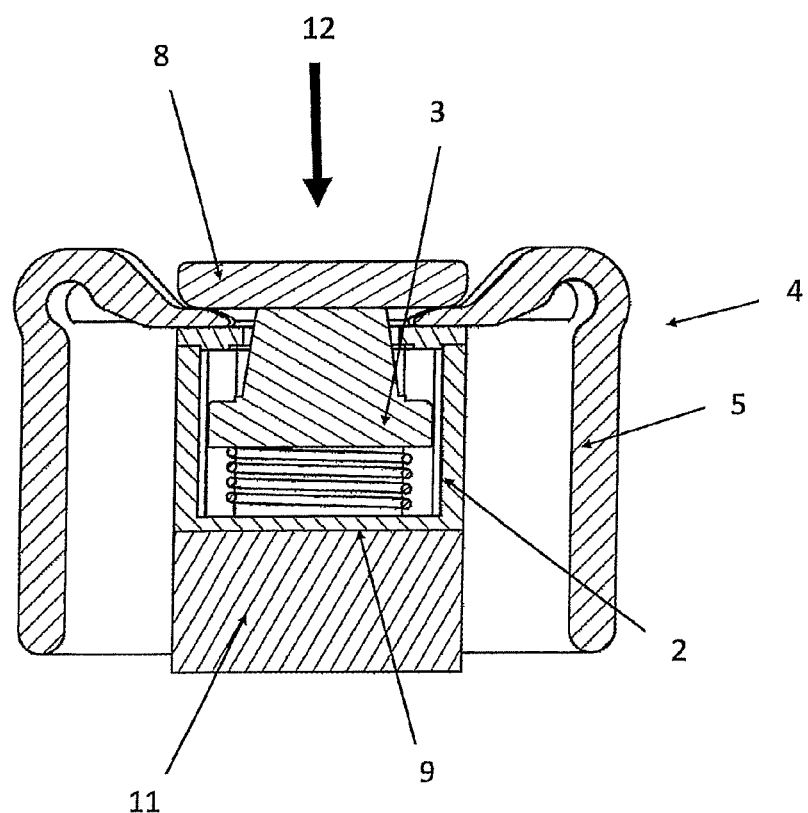

In FIG. 3 it can be seen that with a radial load on the tool carrier 3 in the direction of the arrow 10, the same is deflected from the resiliently mounted basic position according to FIG. 2, which results in that the sensor body 4 is clamped in the region of the gap 7, which leads to a detectable pressure change in the sensor body 4. The corresponding signal can be used in a known manner to stop the robot or the handling device. The same applies to the axial load situation in FIG. 4 according to the arrow 12, in which the sensor body 4 is clamped all around in the gap 7. For the sake of clarity, no tool is shown mounted on the tool carrier 3 or on its mounting plate 8, but it is obvious that loads due to collisions in the sense of arrow 10 or 12 are transmitted via the tool to the tool carrier 3 and cause a corresponding deflection of the tool carrier, whereby the sensor body 4 is actuated by the tool carrier 3.

Figure 5:
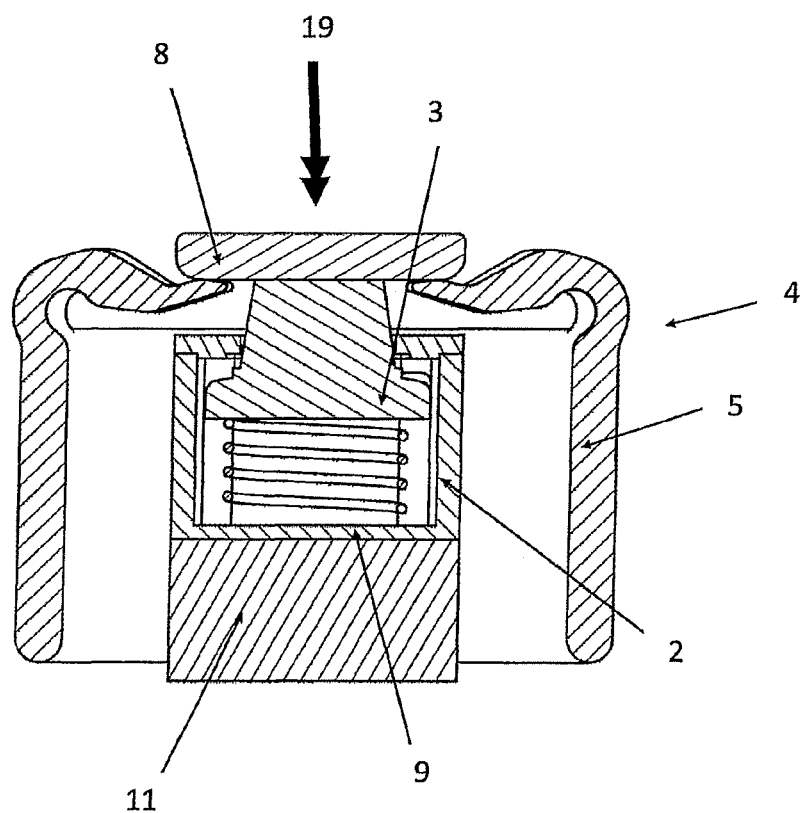
FIG. 5 shows a sectional view of the device after movement of the tool carrier.

FIG. 5 shows that even a slight movement of the tool carrier 3, during which the sensor body 4 is only touched slightly, already leads to a detectable signal and is thus sufficient to detect a collision.

The device according to the invention thus provides a safety flange that is mounted between the robot and the tool. If the tool collides with an obstacle, a force or moment acts on the safety flange. If force or torque exceed preset limit values, the safety flange gives way and at the same time triggers an emergency stop of the robot.

Furthermore, a direct collision of an obstacle with the shell-like sensor body itself leads to a deformation, which is also detected and in turn leads to a stop of the robot. The safety flange thus detects a collision of the tool as well as of the flange itself via the shell designed as a tactile safety sensor.

The invention claimed is:

1. A device for controlling a handling device comprising
   a carrier housing which is configured to be arranged on the handling device with a tactile sensor body arranged on the outside of the carrier housing and
   a tool carrier movably mounted on the carrier housing,
   wherein the sensor body is configured to be actuated by the tool carrier when load is acting on the tool carrier,
   wherein the sensor body is formed by a gas-filled chamber which is surrounded by a flexible shell, which is configured to be deformed by collision with an obstacle, and further comprises a pressure sensor configured for measuring a gas pressure prevailing inside the chamber,
   wherein the sensor body is arranged at least partially in a gap formed between the carrier housing and the tool carrier, and
   wherein the sensor body encloses the carrier housing with a first area and with a second area engages the gap formed between the carrier housing and the tool carrier.

2. The device according to claim 1, wherein the tool carrier has a mounting plate for a tool, which together with the carrier housing forms the gap.

3. The device according to claim 2, wherein the carrier housing comprises a mounting element that matches the mounting plate for a tool.

4. The device according to claim 1, wherein the tool carrier protrudes to the outside from an interior of the carrier housing through an opening in a wall of the carrier housing and is resiliently pressed against an inside face of the wall of the carrier housing.

5. The device according to claim 4, wherein the tool carrier comprises an outwardly tapering shaft on an area protruding outward through the wall of the carrier housing.

6. A handling device with the device according to claim 1.

7. The handling device according to claim 6, wherein the handling device carries a second sensor body in areas different from the device for controlling the handling device.

8. The handling device according to claim 7, wherein each of the sensor body and the second sensor body is formed by a gas-filled chamber which is surrounded by a flexible shell configured to be deformable by collision with an obstacle and furthermore comprises a pressure sensor configured for measuring a gas pressure prevailing inside the chamber.

9. A device for controlling a handling device comprising
a carrier housing which is configured to be arranged on the handling device with a tactile sensor body arranged on the outside of the carrier housing and
a tool carrier movably mounted on the carrier housing,
wherein the sensor body is configured to be actuated by the tool carrier when load is acting on the tool carrier,
wherein the sensor body is formed by a gas-filled chamber which is surrounded by a flexible shell, which is configured to be deformed by collision with an obstacle, and further comprises a pressure sensor configured for measuring a gas pressure prevailing inside the chamber, and
wherein the tool carrier protrudes to the outside from an interior of the carrier housing through an opening in a wall of the carrier housing and is resiliently pressed against an inside face of the wall of the carrier housing.

* * * * *

UNITED STATES PATENT AND TRADEMARK OFFICE
CERTIFICATE OF CORRECTION

PATENT NO. : 11,964,381 B2
APPLICATION NO. : 17/048854
DATED : April 23, 2024
INVENTOR(S) : Andreas Baldinger et al.

It is certified that error appears in the above-identified patent and that said Letters Patent is hereby corrected as shown below:

On the Title Page

Item (71) Applicant:
Correct "BLUE DANUBE ROBOTICS GMBH, Vienna (AT)" to -- BLUE DANUBE ROBOTICS GMBH, Wien (AT) --

Item (72) Inventors:
Correct "Andreas Baldinger, Vienna (AT)" to -- Andreas Baldinger, Wien (AT) --
Correct "Tobias Ferner, Vienna (AT)" to -- Tobias Ferner, Wien (AT) --
Correct "Walter Wohlkinger, Vienna (AT)" to -- Walter Wohlkinger, Wien (AT) --
Correct "Michael Zillich, Vienna (AT)" to -- Michael Zillich, Wien (AT) --

Item (73) Assignee:
Correct "BLUE DANUBE ROBOTICS GMBH, Vienna (AT)" to -- BLUE DANUBE ROBOTICS GMBH, Wien (AT) --

Signed and Sealed this
Eighteenth Day of June, 2024

Katherine Kelly Vidal
*Director of the United States Patent and Trademark Office*